United States Patent
Selman et al.

(10) Patent No.: US 10,808,578 B2
(45) Date of Patent: Oct. 20, 2020

(54) STACK ENERGY CONTROL IN COMBINED CYCLE POWER PLANT USING HEATING SURFACE BYPASSES

(71) Applicant: Siemens Energy, Inc., Orlando, FL (US)

(72) Inventors: Uygar O. Selman, Oviedo, FL (US); Matthew Kalish, Oviedo, FL (US); Stephanie Boisvert, Oviedo, FL (US); Ankur Deshmukh, Oviedo, FL (US); Marc Fimpel, Erlangen (DE); Balaji Ramamurthy, Oviedo, FL (US); Miguel Cancelado, Orlando, FL (US); Peter Witte, Leiden (NL); Peter Simon Rop, Benthuizen (NL)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 198 days.

(21) Appl. No.: 16/064,154

(22) PCT Filed: Dec. 22, 2015

(86) PCT No.: PCT/US2015/067248
§ 371 (c)(1),
(2) Date: Jun. 20, 2018

(87) PCT Pub. No.: WO2017/111932
PCT Pub. Date: Jun. 29, 2017

(65) Prior Publication Data
US 2018/0371956 A1 Dec. 27, 2018

(51) Int. Cl.
*F01K 23/10* (2006.01)
*F22B 1/18* (2006.01)
(Continued)

(52) U.S. Cl.
CPC .......... *F01K 23/108* (2013.01); *F01K 23/106* (2013.01); *F01L 19/00* (2013.01);
(Continued)

(58) Field of Classification Search
CPC .......... F01K 13/00; F01K 13/02; F01K 23/04; F01K 23/06; F01K 23/10; F01K 23/106;
(Continued)

(56) References Cited

U.S. PATENT DOCUMENTS 2,427,031 A * 9/1947 Toomey ............... F22D 1/02
165/145
3,177,659 A * 4/1965 Berman ............... F22B 35/007
60/39.182

(Continued)

FOREIGN PATENT DOCUMENTS

EP 2698507 A1 2/2014
GB 2298243 A 8/1996
(Continued)

OTHER PUBLICATIONS

PCT International Search Report and Written Opinion dated Aug. 26, 2016 corresponding to PCT Application No. PCT/US2015/067248 filed Dec. 22, 2015.

*Primary Examiner* — Alain Chau

(57) ABSTRACT

A combined cycle power plant and method for operating a combined power plant with stack energy control are presented. The combined cycle power plant includes a gas turbine, a heat recovery steam generator including a plurality of heating surfaces, and a steam turbine. The heating surfaces may be partially bypassed to reduce steam production in the heat recovery steam generator during power plant startup. Less energy may be extracted from exhaust gas of the gas turbine. More energy may be dumped through an exhaust stack. The steam turbine may start without restriction of a gas turbine load during power plant startup. The
(Continued)

steam turbine may start without increasing a size of an air cooled condenser while maintaining a higher load of a gas turbine during power plant startup.

15 Claims, 4 Drawing Sheets

(51) Int. Cl.
| | |
|---|---|
| F02C 6/18 | (2006.01) |
| F02G 5/02 | (2006.01) |
| F01D 19/00 | (2006.01) |
| F01K 9/00 | (2006.01) |
| F01K 13/02 | (2006.01) |
| F01K 23/04 | (2006.01) |
| F01L 19/00 | (2006.01) |

(52) U.S. Cl.
CPC .............. *F02C 6/18* (2013.01); *F02G 5/02* (2013.01); *F22B 1/1815* (2013.01); *F01K 9/00* (2013.01); *F01K 13/02* (2013.01); *F01K 23/04* (2013.01); *Y02E 20/16* (2013.01)

(58) Field of Classification Search
CPC .... F01K 23/101; F01K 23/105; F01K 23/108; F01K 9/00; F01K 7/40; Y02E 20/16; F22B 1/1815; F02C 6/18; F02C 9/18; F01D 19/00; F05D 2220/72; F22G 5/12; F02G 5/02
See application file for complete search history.

(56) References Cited

U.S. PATENT DOCUMENTS

| | | | | | |
|---|---|---|---|---|---|
| 3,640,250 | A | * | 2/1972 | Costello | F22G 5/12 122/406.5 |
| 4,353,206 | A | * | 10/1982 | Lee | B01D 53/56 60/39.182 |
| 4,353,207 | A | * | 10/1982 | Lee | B01D 53/8631 60/39.182 |
| 4,465,027 | A | * | 8/1984 | Steinegger | B01D 19/0068 122/406.4 |
| 4,576,124 | A | * | 3/1986 | Martens | F01K 23/108 122/406.5 |
| 4,735,043 | A | * | 4/1988 | Hamill | F01B 29/12 122/406.4 |
| 5,412,937 | A | * | 5/1995 | Tomlinson | F01K 23/106 60/39.182 |
| 5,577,377 | A | * | 11/1996 | Tomlinson | F01K 23/106 60/39.182 |
| 5,628,179 | A | * | 5/1997 | Tomlinson | F01K 23/106 60/783 |
| 5,904,039 | A | * | 5/1999 | Bruckner | B01D 19/0047 60/39.182 |
| 6,220,014 | B1 | * | 4/2001 | Wada | F01K 13/025 60/39.182 |
| 6,223,536 | B1 | * | 5/2001 | Liebig | F01K 23/106 60/646 |
| 6,237,321 | B1 | * | 5/2001 | Schmid | F01K 23/106 60/783 |
| 6,363,711 | B2 | * | 4/2002 | Schmid | F01K 23/106 60/39.182 |
| 6,397,575 | B2 | * | 6/2002 | Tomlinson | F01K 23/106 60/39.182 |
| 6,405,525 | B1 | * | 6/2002 | Droux | F01K 23/10 122/7 R |
| 6,434,925 | B2 | * | 8/2002 | Hannemann | F02C 3/30 60/39.12 |
| 6,823,674 | B2 | * | 11/2004 | Schwarzott | F01K 23/106 60/39.182 |
| 7,074,259 | B2 | * | 7/2006 | Liebig | B01D 19/0005 60/39.182 |
| 7,168,233 | B1 | * | 1/2007 | Smith | F01K 23/106 60/39.182 |
| 8,186,142 | B2 | * | 5/2012 | Narayan | F01K 23/106 60/39.182 |
| 8,739,509 | B2 | * | 6/2014 | Asanaka | F01K 13/02 60/39.182 |
| 8,820,078 | B1 | * | 9/2014 | Duffy | F22B 1/00 60/646 |
| 9,074,494 | B2 | * | 7/2015 | Pang | F22G 5/04 |
| 9,399,927 | B2 | * | 7/2016 | McDeed | F01K 5/02 |
| 9,429,045 | B2 | * | 8/2016 | Bruckner | F01K 23/108 |
| 9,581,328 | B2 | * | 2/2017 | Schroeder | F22D 1/003 |
| 9,593,844 | B2 | * | 3/2017 | Bruckner | F22B 35/007 |
| 10,167,743 | B2 | * | 1/2019 | Olia | F01K 23/10 |
| 2001/0007190 | A1 | * | 7/2001 | Schmid | F01K 23/106 60/39.182 |
| 2001/0037641 | A1 | * | 11/2001 | Hannemann | F01K 23/10 60/39.12 |
| 2001/0047646 | A1 | * | 12/2001 | Tomlinson | F01K 23/106 60/772 |
| 2002/0144505 | A1 | * | 10/2002 | Sonoda | F01K 23/10 60/618 |
| 2004/0025510 | A1 | * | 2/2004 | Schwarzott | F01K 23/106 60/772 |
| 2004/0187687 | A1 | * | 9/2004 | Liebig | B01D 19/0005 95/251 |
| 2009/0090111 | A1 | * | 4/2009 | Tomlinson | F01K 23/106 60/783 |
| 2010/0031625 | A1 | * | 2/2010 | Narayan | F01K 23/106 60/39.5 |
| 2010/0031660 | A1 | * | 2/2010 | Narayan | F02C 7/224 60/734 |
| 2010/0089024 | A1 | * | 4/2010 | Bruckner | F01K 23/108 60/39.182 |
| 2010/0281877 | A1 | * | 11/2010 | Asanaka | F01K 13/02 60/778 |
| 2011/0023487 | A1 | * | 2/2011 | Olia | F01K 23/10 60/653 |
| 2011/0225972 | A1 | * | 9/2011 | Bruckner | F01K 23/101 60/645 |
| 2012/0037097 | A1 | * | 2/2012 | Schroeder | F22D 1/003 122/1 C |
| 2012/0131919 | A1 | | 5/2012 | Held et al. | |
| 2012/0312019 | A1 | * | 12/2012 | Rechtman | F22B 1/1815 60/645 |
| 2013/0097993 | A1 | * | 4/2013 | Raja | F01K 23/14 60/39.182 |
| 2013/0098313 | A1 | * | 4/2013 | Pang | F01K 23/108 122/460 |
| 2013/0180228 | A1 | * | 7/2013 | Zhang | F01K 23/10 60/39.182 |
| 2015/0204214 | A1 | * | 7/2015 | McDeed | F23J 15/02 60/772 |
| 2017/0284307 | A1 | * | 10/2017 | Inoue | F01D 11/24 |

FOREIGN PATENT DOCUMENTS

| | | |
|---|---|---|
| JP | 11093693 A | 4/1999 |
| JP | H11270348 A | 10/1999 |
| JP | 2001317704 A | 11/2001 |
| JP | 3694530 B2 | 9/2005 |
| JP | 2012508861 A | 4/2012 |
| JP | 2013151887 A | 8/2013 |

* cited by examiner

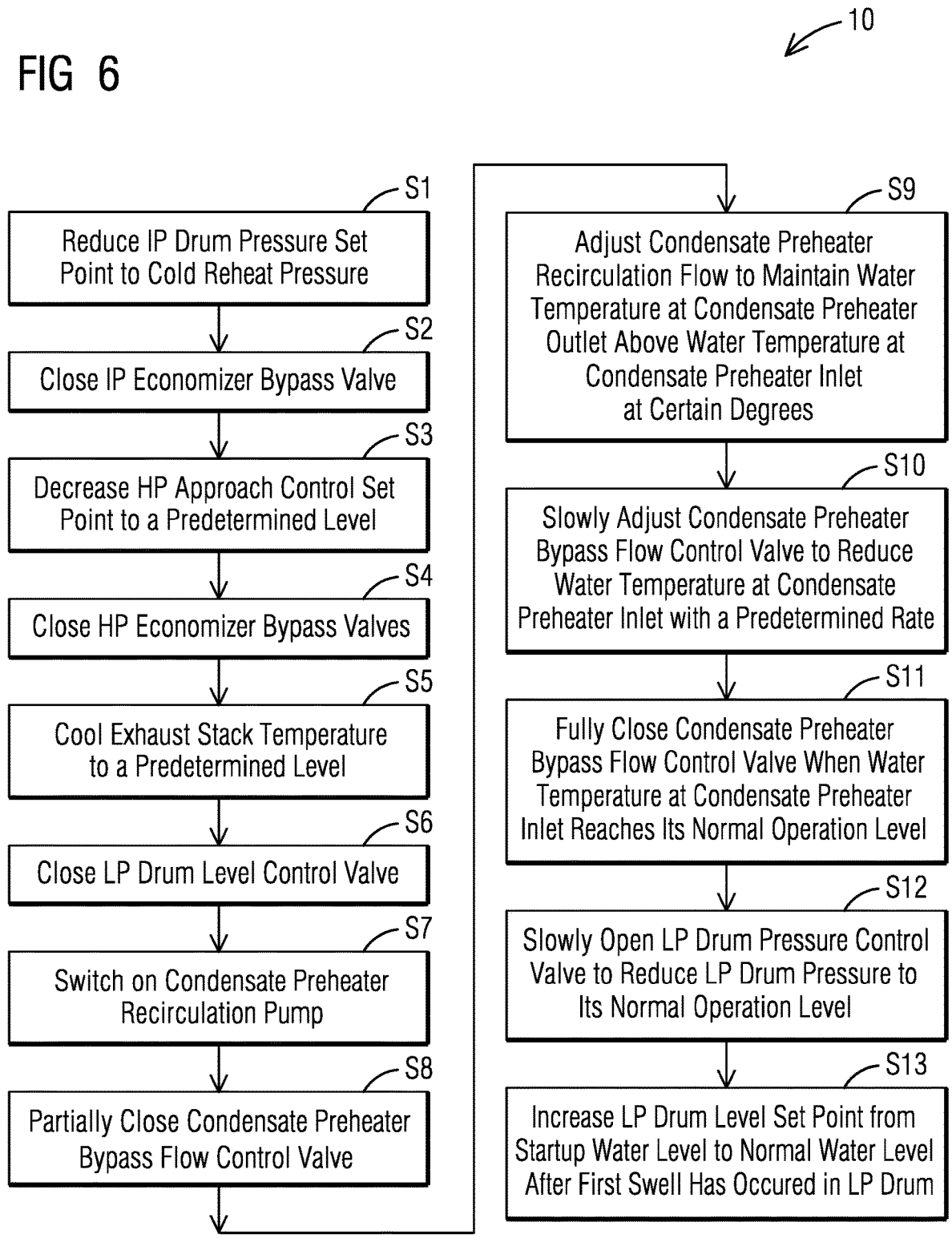

STACK ENERGY CONTROL IN COMBINED CYCLE POWER PLANT USING HEATING SURFACE BYPASSES

FIELD

Aspects of the present invention relate to a combined cycle power plant and a method for operating a combined cycle power plant with stack energy control.

DESCRIPTION OF RELATED ART

A combined cycle power plant may consist of one or more gas turbines generating power output from combustion of a fuel gas and air mixture. One or more heat recovery steam generators may be located downstream from the gas turbines to receive exhaust gas from the gas turbines. The heat recovery steam generators may extract energy from the exhaust gas to produce steam. The steam may be transferred to a steam turbine for generating additional power output. A steam turbine may consist of multiple pressure steam turbines, such as a high pressure stream turbine, an intermediate pressure steam turbine, and a low pressure steam turbine. A condenser may be located at an exit of the steam turbine.

In order to be able to roll off the steam turbine, exhaust pressure of the low pressure steam turbine has to be reduced and maintained to a certain level. This may require an additional cooling capacity in a condenser. A condenser may be a water cooled condenser or an air cooled condenser. For power plants with a water cooled condenser, the additional cooling capacity may be achieved with minor impact. For power plants with an air cooled condenser, however, the additional cooling capacity may come with a significant cost impact.

During the steam turbine starts, all the steam generated in the heat recovery steam generator may be bypassed to the condenser. Cooling capacity of a condenser may not be adequate to maintain a pressure of the condenser below a required steam turbine limit. More cooling capacity of the condenser may be needed when gas turbines operating at a higher load, for example at a base load. Cooling capacity of the condenser may be required even more when gas turbines operating at a higher load on warmer ambient days. One way to overcome the problem may be to reduce heat load of the condenser by lowering load of the gas turbines. This approach may restrict power generation capacity of a power plant. Another way to overcome the problem may be to increase size of the condenser. Increasing size of an air cooled condenser may significantly increase overall plant footprint. It may result a significant increase of construction cost of the power plant.

SUMMARY

Briefly described, aspects of the present invention relate to a combined cycle power plant and a method for operating a combined cycle power plant with stack energy control.

According to an aspect, a combined cycle power plant is presented. The combined cycle power plant comprises a gas turbine that is configured to generate power output and produce exhaust gas. The combined cycle power plant comprises a heat recovery steam generator comprising a plurality of heating surfaces located downstream of the gas turbine that is configured to receive the exhaust gas from the gas turbine and produce steam by extracting energy from the exhaust gas. The combined cycle power plant comprises an exhaust stack that is configured to dump the exhaust gas after passing through the plurality of heating surfaces. The combined cycle power plant comprises a steam turbine that is configured to receive the steam produced in the heat recovery steam generator to generate power output. The plurality of the heating surfaces are configured to be partially bypassed during startup of the power plant to reduce a production of the steam such that less energy is extracted from the exhaust gas. The exhaust stack is configured to dump the exhaust gas having more energy due to the reducing of the production of the steam and the less energy extracted from the exhaust gas during the startup of the power plant. The steam turbine is configured to be able to start while operating the gas turbine at a load up to a base load.

According to an aspect, a method for operating a combined cycle power plant is presented. The combined cycle power plant comprise a gas turbine, a heat recovery steam generator comprising a plurality of heating surfaces located downstream of the gas turbine, and a steam turbine. The method comprises operating the gas turbine to generate power output and produce exhaust gas. The method comprises partially bypassing the plurality of the heating surfaces for reducing production of steam generated in the heat recovery steam generator such that less energy is extracted from the exhaust gas of the gas turbines during startup of the power plant. The method comprises dumping the exhaust gas having more energy through an exhaust stack due to the reducing of the production of the steam and the less energy extracted from the exhaust gas during the startup of the power plant. The method comprises starting the steam turbine while operating the gas turbine at a load up to a base load.

Various aspects and embodiments of the application as described above and hereinafter may not only be used in the combinations explicitly described, but also in other combinations. Modifications will occur to the skilled person upon reading and understanding of the description.

BRIEF DESCRIPTION OF THE DRAWINGS

Exemplary embodiments of the application are explained in further detail with respect to the accompanying drawings. In the drawings:

FIG. 6 illustrated a schematic flow chart for transitioning a combined cycle power plant from stack energy control startup to a normal operation mode according to an embodiment.

To facilitate understanding, identical reference numerals have been used, where possible, to designate identical elements that are common to the figures.

DETAILED DESCRIPTION OF INVENTION

A detailed description related to aspects of the present invention is described hereafter with respect to the accompanying figures.

Figure 1:
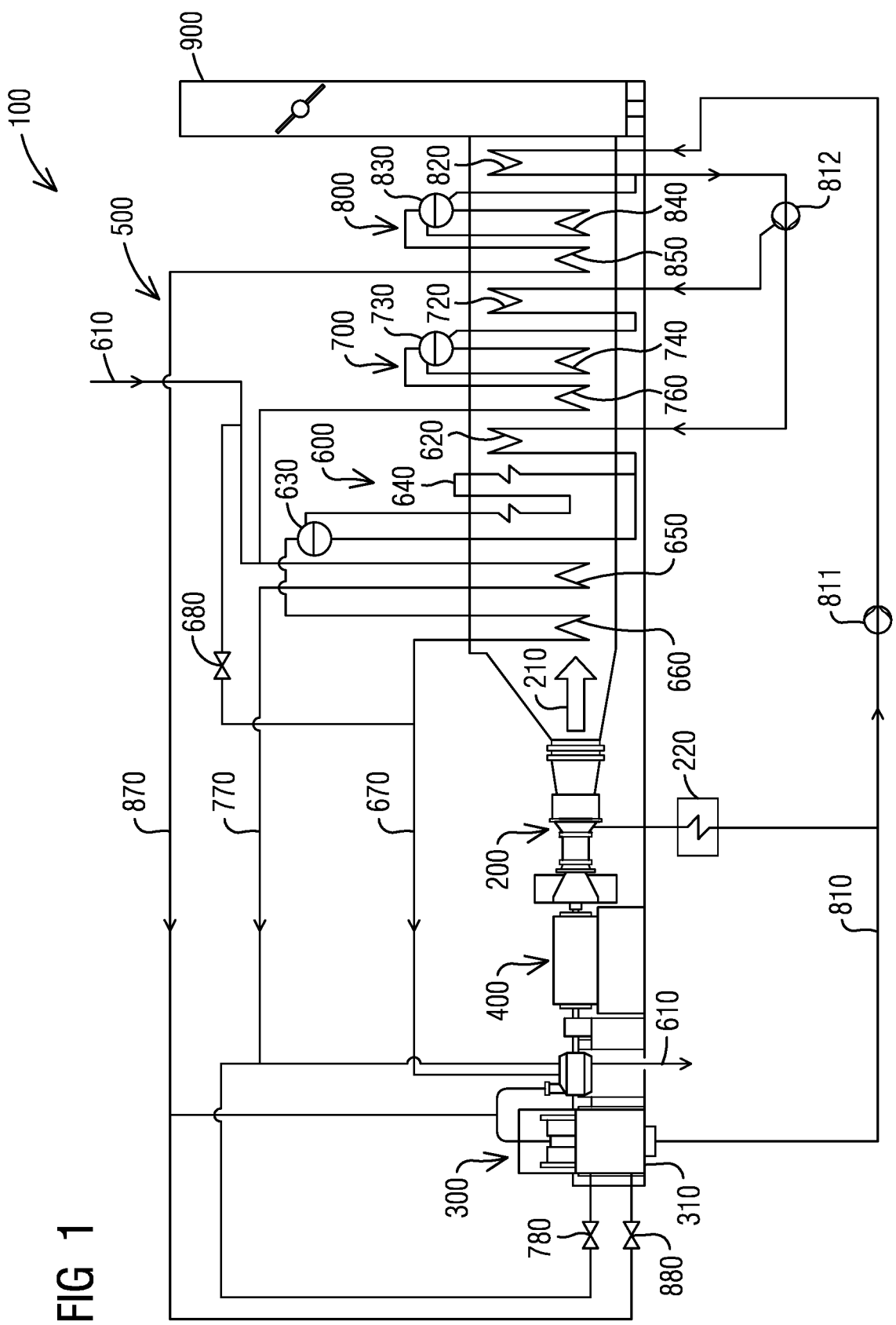
FIG. 1 illustrates a schematic diagram of a combined cycle power plant according to an embodiment.

FIG. 1 illustrates a schematic diagram of a combined cycle power plant 100 according to an embodiment. As illustrated in the exemplary embodiment of FIG. 1, the combined cycle power plant 100 may includes a gas turbine 200. The gas turbine 200 may generate power output from combustion of a fuel gas and air mixture. The gas turbine 200 may connects to a generator 400 to output the power output. The gas turbine 100 may produce exhaust gas 210 at an exit of the gas turbine 200. According to the illustrated example embodiment, the power plant 100 may include a fuel gas heater 220 for preheating the fuel gas.

According to an embodiment, a combined cycle power plant 100 may include a heat recovery steam generator (HRSG) 500. As illustrated in the example embodiment of FIG. 1, the HRSG 500 may be located downstream of the gas turbine 200. The HRSG 500 may receive the exhaust gas 210 from the gas turbine 200. According to an embodiment, a HRSG 500 may include multiple pressure steam systems. In the illustrated exemplary embodiment of FIG. 1, the HRSG 500 comprises three pressure steam systems comprising a high pressure (HP) steam system 600, an intermediate pressure (IP) steam system 700, and a low pressure (LP) steam system 800. The HRSG 500 comprises a plurality of heating surfaces. In the illustrated example embodiment of FIG. 1, the heating surfaces of the HRSG 500 comprises a HP superheater 660, a reheater 650, a HP evaporator 640, a HP economizer 620, an IP superheater 760, an IP evaporator 740, an IP economizer 720, a LP superheater 850, a LP evaporator 840, and a condensate preheater 820. The exhaust gas 210 flows across the heating surfaces to produce steam by extracting energy from the exhaust gas 210. According to an embodiment, the power plant 100 may include an exhaust stack 900. The exhaust gas 210 may exit the combined cycle power plant 100 via the exhaust stack 900 after passing through the heating surfaces. According to the illustrated exemplary embodiment in FIG. 1, the HRSG 500 comprises a HP drum 630, an IP drum 730, and a LP drum 830.

According to an embodiment, a combined cycle power plant 100 may include a steam turbine 300. The steam turbine 300 may receive the steam generated in the HRSG 500 to produce power output. According to an embodiment, a combined cycle power plant 100 may be in a single shaft configuration, or in a multi-shaft configuration. The combined cycle power plant 100 illustrated in FIG. 1 is in a single shaft configuration, where the gas turbine 200 and the steam turbine 300 are connected to a common generator 400. In a multi-shaft configuration, a gas turbine 200 and a steam turbine 300 may be connected to separate generators respectively.

According to an embodiment, a steam turbine 300 may include multiple pressure steam turbines, for example, a HP steam turbine, an IP steam turbine, and a LP steam turbine. According to an example embodiment illustrated in FIG. 1, a HP steam turbine may receive HP steam generated in the HP steam system 600 via a HP steam line 670. An IP steam turbine may receive IP steam generated in an IP steam system 700 via an IP steam line 770. A LP steam turbine may receive LP steam generated in a LP steam system 800 via a LP steam line 870. According to an embodiment, exhaust steam from a high pressure steam turbine may be routed back to a HRSG 500 via a cold reheat 610 and reheated in a reheater 650 to generate additional IP steam.

According to an embodiment, a condenser 310 may be located at an exit of the steam turbine 300. Water from the condenser 310 may be returned to a condensate preheater 820 of a HRSG 500 via a condensate line 810 with an aid of a condensate extraction pump 811. A boiler feed pump 812 may located downstream of the condensate preheater 820 to feed water into a HP steam system 600 and an IP steam system 700.

According to an embodiment, during a startup of a power plant 100 or when a steam turbine 300 is unavailable, LP steam generated in a HRSG 500 may be bypassed to a condenser 310 via a LP steam bypass valve 880. HP steam generated in a HRSG 500 may be bypassed to cold reheat 610 via a HP steam bypass valve 680. The HP bypass steam may mix up with IP steam generated in an IP steam system 700 of a HRSG 500 and flow through a reheater 650. The reheated steam may be bypassed to a condenser 310 via an IP steam bypass valve 780.

According to an embodiment, when a steam turbine 300 is in operation, exhaust pressure of the steam turbine 300 has to be maintained below a trip level. During a startup of a power plant 100 or when a steam turbine 300 is unavailable, all steam generated in a HRSG 500 may be bypassed to a condenser 310. When a gas turbine 200 operates at a high load, such as up to a base load, on warmer ambient days, cooling capacity of the condenser 310 may not be adequate to maintain backend pressure of the steam turbine 300 below a required limit.

One approach to address the problem may include holding a load of a gas turbine 200 at a partial load level during power plant 100 startup. Pressure of a condenser 310 may be maintained below a trip level such that a steam turbine 300 may be rolled off. The gas turbine 200 may be ramped up to a base load when the steam turbine 300 is able to take all the steam generated in a HRSG 500. This approach, however, reduces overall power output of the power plant 100 during startup. Other approach may include increasing a size of a condenser 310. For a power plant 100 with an air cooled condenser, this approach, however, may significantly increase an overall footprint of the power plant 100 and construction cost of the power plant 100.

The illustrated embodiments present a combined cycle power plant 100 and a method for operating the combined cycle power plant 100 that may eliminate a need for restricting a load ramp of a gas turbine 200 during startup of the power plant 100. The illustrated embodiments may eliminate a need to increase a size of an air cooler condenser for maintaining a backpressure of a steam turbine 300 below trip level during startup of the power plant 100. The illustrated embodiments may reduce a production of steam in a HRSG 500 by partially bypassing heating surfaces of the HRSG 500 during startup of the power plant 100. Less energy may be extracted from exhaust gas 210 of a gas turbine 200. The exhaust gas 210 having more energy may be dumped through an exhaust stack 900. A steam turbine 300 may start while operating the gas turbine 200 at a load up to a base during startup of a power plant 100. A steam turbine 300 may start while operating the gas turbine 200 at a load up to a base at a warm ambient temperature, such as an ambient temperature up to 90 F or higher, during startup of a power plant 100.

Figure 2:
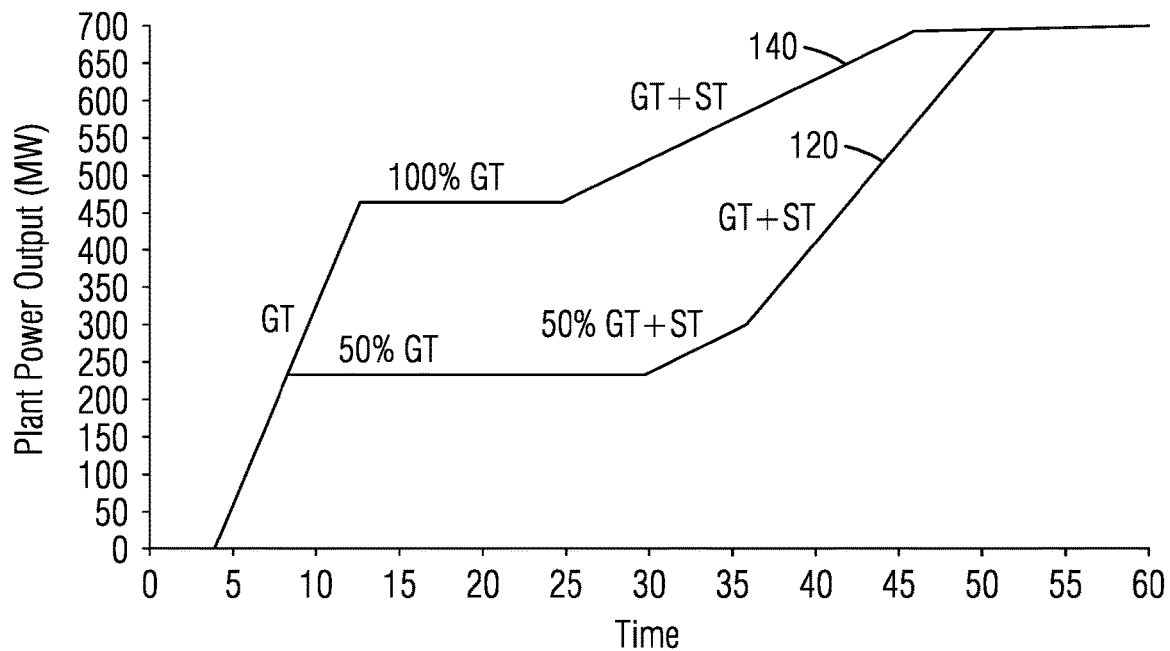
FIG. 2 illustrates a schematic graphic of plant power output curve of a combined cycle power plant according to an embodiment.

FIG. 2 illustrates a schematic graphic of plant power output curve of a combined cycle power plant 100 according to an embodiment. As illustrated in FIG. 2, a curve 120 may represent a plant power output with restricting a load ramp of a gas turbine (GT) during startup of the power plant 100. In the illustrated example embodiment, a load of a GT may be held at a partial load level, such as 50% load level, when starting a steam turbine (ST) during startup of the power plant 100. A curve 140 may represent a plant power output without restricting a load ramp of a GT during startup of the power plant 100. In the illustrated example embodiment, a GT may be ramped up to a high load, such as up to a base load when starting a ST during startup of the power plant 100. As illustrated in FIG. 2, power plant 100 may produce more power output without restricting a load ramp of a GT than power output with restricting a load ramp of a GT during plant startup. According to an embodiment, a startup time of a power plant 100 without restricting a load ramp of a GT may be reduced compared to a startup time of a power plant 100 with restricting a load ramp of a GT.

Figure 3:
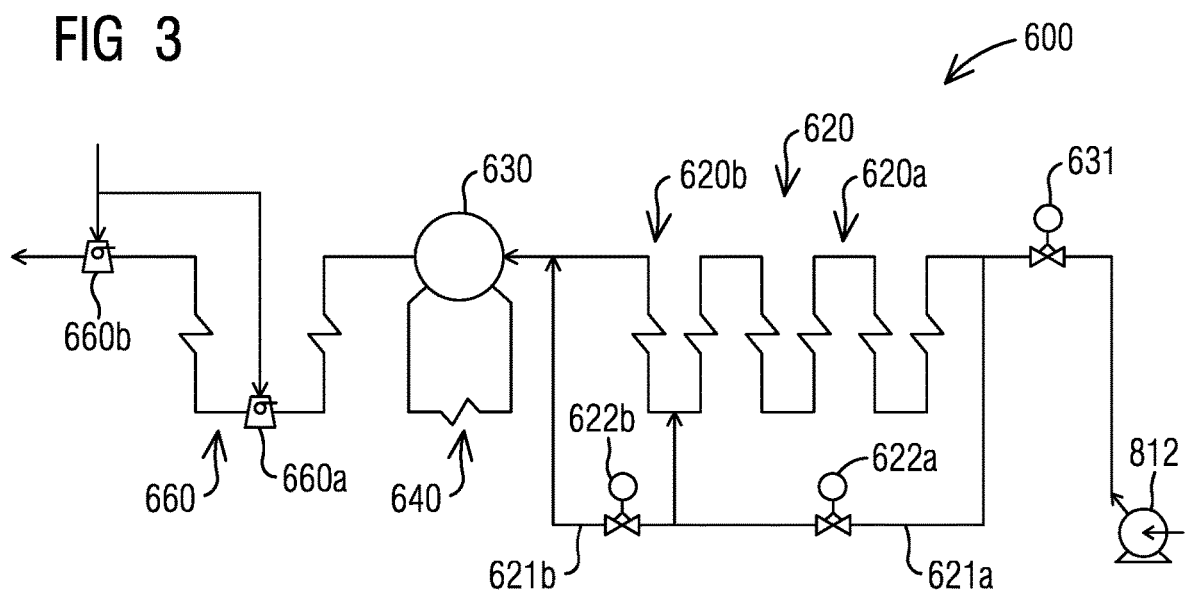
FIG. 3 illustrates a schematic diagram of a high pressure steam system of a heat recovery steam generator according to an embodiment.

FIG. 3 illustrates a schematic diagram of a HP steam system 600 of a HRSG 500 according to an embodiment. According to an embodiment as illustrated in FIG. 3, water may be fed into the HP steam system 600 by a boiler feed pump 812. As illustrated in the example embodiment, the HP steam system 600 comprises a plurality of heating surfaces, for example, a HP economizer 620, a HP evaporator 640 located downstream of the HP economizer 620, and a HP superheater 660 located downstream of the HP evaporator 640. HP drum 630 may be connected to the HP evaporator 640. A HP drum level control valve 631 may be located upstream of a HP drum 630. According to an embodiment, a HP economizer 620 may include a plurality of stages. In the illustrated example embodiment of FIG. 3, the HP economizer 620 comprises six stages. An upstream HP economizer 620a comprises several upstream stages. A downstream HP economizer 620b comprises several downstream stages. As illustrated in the example embodiment of FIG. 3, an upstream HP economizer 620a comprises first five upstream stages. A downstream HP economizer 620b comprises a final downstream stage.

According to an embodiment, a HP economizer 620 may have interconnecting piping for partially bypass the HP economizer 620. According to an embodiment as illustrated in FIG. 3, an upstream HP economizer 620a may be partially bypassed via an upstream HP economizer bypass line 621a with an aid of an upstream HP economizer bypass valve 622a. A downstream HP economizer 620b may be partially bypassed via a downstream HP economizer bypass line 621b with an aid of a downstream HP economizer bypass valve 622b.

According to an embodiment, no flashing or minimal flashing may occur in the downstream HP economizer 620b comprises a final stage of the HP economizer 620. According to an embodiment, the downstream HP economizer 620b may be partially bypassed to a predetermined level such that a predetermined level of flashing may be allowable in the final stage of the HP economizer 620. According to an embodiment, the downstream HP economizer 620b may be partially bypassed to a predetermined level, for example, up to about 20%. This may allow up to about 5% flashing in the final stage of the HP economizer 620. According to an embodiment, an upstream HP economizer 620a may be partially bypassed to a predetermined level that may be higher than the downstream HP economizer 620b. According to an embodiment, an upstream HP economizer 620a may be partially bypassed to a predetermined level, for example, up to about 90%. A minimum flow of about 10% may be maintained through the HP economizer 620 at all times. Size of the upstream HP economizer bypass lines 621a may be designed to accommodate the up to 90% bypass flow to the upstream HP economizer 620a. The upstream HP economizer bypass valve 622a may be designed accordingly to control the up to about 90% bypass flow. According to an exemplary embodiment, a size of the upstream HP economizer bypass line 621a may be around 6" diameter. According to an exemplary embodiment, size of the downstream HP economizer bypass lines 621b may be designed to accommodate the up to about 20% bypass flow to the downstream HP economizer 620b. The downstream HP economizer bypass valve 622b may be designed accordingly to control the up to about 20% bypass flow. According to an exemplary embodiment, a mixed point of the upstream HP economizer bypass line 621a and the downstream HP economizer bypass line 621b may be designed with a thermal sleeve and sparge pipe to permit up to about 5% flashing.

According to an embodiment as illustrated in FIG. 3, the HP steam system 600 comprises an inter-stage attemperator 660a. The inter-stage attemperator 660a may be arranged in the HP superheater 660. According to an embodiment, the HP steam system 600 comprises a final stage attemperator 660b.

According to an embodiment, temperature of steam generated in a HP superheater 660 may be reduced by increasing inter-stage spray water flow during power plant startup, for example, increasing inter-stage spray water flow up to a maximum level. According to an embodiment, temperature of steam generated in a reheater 650 may be reduced by increasing inter-stage spray water flow during power plant startup, for example, increasing inter-stage spray water flow up to a maximum level.

According to an embodiment referring to FIG. 1, temperature of HP bypass steam to cold reheat 610 may be reduced with an aid of a HP steam bypass valve 680 during power plant startup. According to an embodiment, temperature of HP bypass steam to cold reheat 610 may be reduced to 500° F. during power plant startup. This may allow absorbing more energy of an exhaust gas 210 at a front end of a HRSG 500. This may reduce temperature of an exhaust gas 210 at a final stage of a HP economizer 620. This may reduce temperature of an exhaust gas 210 at IP steam system 700 and LP steam system 800. This may reduce pressure levels for bottling up the IP steam system 700 and the LP steam system 800.

Figure 4:
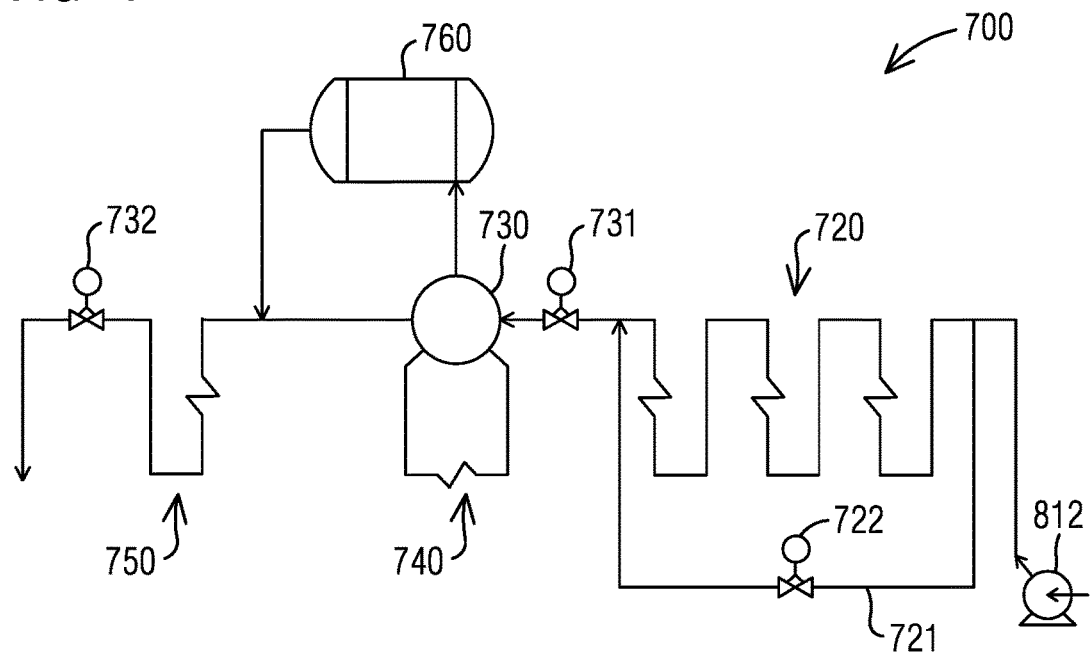
FIG. 4 illustrates a perspective schematic diagram of an intermediate pressure steam system of a heat recovery steam generator according to an embodiment.

FIG. 4 illustrates a perspective schematic diagram of an IP steam system 700 of a HRSG 500 according to an embodiment. According to an embodiment as illustrated in FIG. 4, water may be fed into the IP steam system 700 by a boiler feed pump 812. As illustrated in the example embodiment, the IP steam system 700 comprises a plurality of heating surfaces, for example, IP economizer 720, IP evaporator 740 located downstream of the IP economizer 720, and IP superheater 750 located downstream of the IP evaporator 740. An IP drum 730 may be connected to the IP evaporator 740. An IP rotor air cooler 760 may be connected to the IP drum 730. An IP drum level control valve 731 may be located upstream of the IP drum 730. An IP drum pressure control valve 732 may be located at outlet of the IP superheater 750.

According to an embodiment, an IP economizer 720 may be partially bypassed during power plant startup via an IP economizer bypass line 721 with an aid of an IP economizer bypass valve 722. A minimum flow through the IP economizer 720 may be maintained during power plant startup. This may allow remaining the IP rotor air cooler 760 in operation during power plant startup. This may avoid thermal quench in the IP economizer 720 when cold water is introduced into a hot IP economizer 720 during transitioning from power plant startup to a normal operation mode.

According to an embodiment as illustrated in FIG. 4, pressure of an IP drum 730 may be increased with an aid of an IP drum pressure control valve 732 during power plant startup with stack energy control. According to an embodiment, pressure of the IP drum 730 may be increased such that steam generation in the IP drum 730 may be eliminated during power plant startup with stack energy control. According to an embodiment, steam generation in an IP steam system 700 may be produced by an IP rotor air cooler 760. According to an embodiment, pressure of the IP drum 730 may be increased above to pressure of cold reheater 610 during power plant startup.

Figure 5:
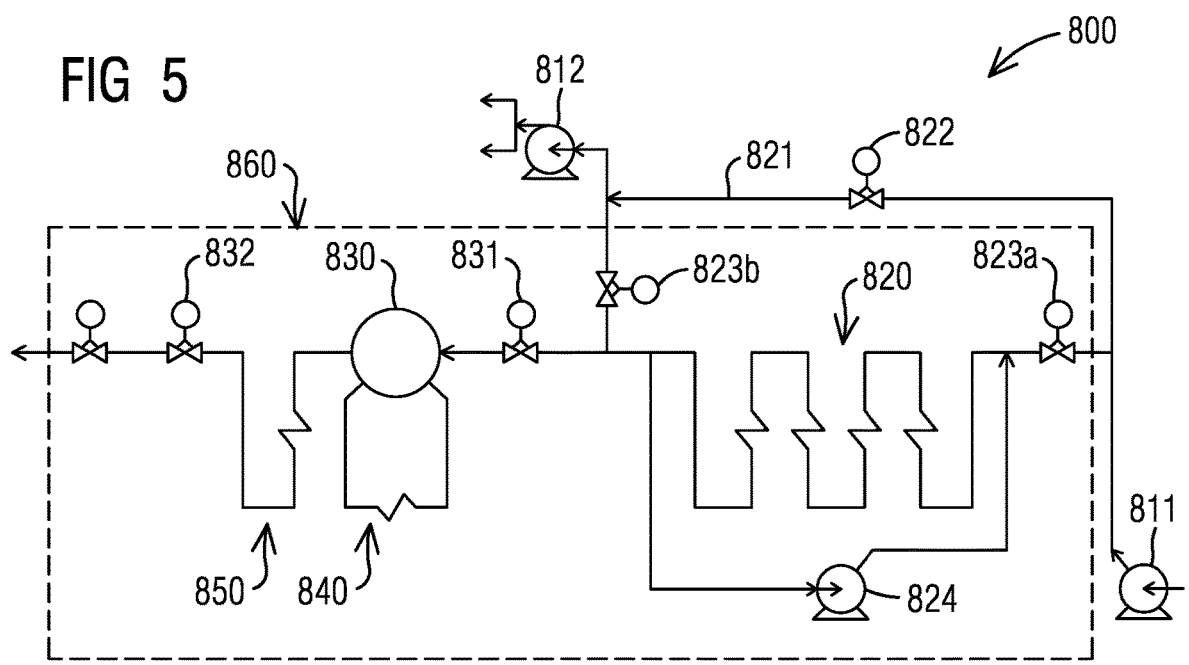
FIG. 5 illustrates a schematic diagram of a low pressure steam system of a heat recovery steam generator according to an embodiment.

FIG. 5 illustrates a schematic diagram of a LP steam system 800 of a HRSG 500 according to an embodiment. According to an illustrated example embodiment of FIG. 5, condensate may enter into the LP steam system 800 with an aid of a condensate extraction pump 811. As illustrated in the example embodiment, the LP steam system 800 comprises a plurality of heating surfaces, for example, LP condensate preheater 820, LP evaporator 840 located downstream of the LP condensate preheater 820, and LP superheater 850 located downstream of the LP evaporator 840. LP drum 830 may be connected to the LP evaporator 840. A LP drum level control valve 831 may be located upstream of the LP drum 830. A LP drum pressure control valve 832 may be located at outlet of the LP superheater 850. According to an embodiment as illustrated in FIG. 5, a condensate recirculation pump 824 may be arranged in the condensate preheater 820.

According to the illustrated embodiment of FIG. 5, the LP steam system 800 comprises a condensate preheater bypass line 821. A condensate preheater bypass flow control valve 822 may be arranged in the condensate preheater bypass line 821. According to the illustrated embodiment, an upstream condensate preheater isolation valve 823*a* may be located at an inlet of the LP condensate preheater 820. A downstream condensate preheater isolation valve 823*b* may be located at an outlet of the LP condensate preheater 820. According to an embodiment, a LP condensate preheater 820 may be bypassed during power plant startup with stack energy control. The LP steam system 800 may be blocked in to shut off steam production during power plant startup with stack energy control. An area 860 of the LP steam system 800 may be isolated during power plant startup. According to an illustrated example embodiment of FIG. 5, the isolated area 860 may include from an inlet of the LP condensate preheater 820 to an outlet of the LP superheater 850. Condensate entering into a LP steam system 800 may be fed into a IP steam system 700 and a HP steam system 800 by a boiler feed pump 812 after bypassing the LP condensate preheater 820. The LP steam system 800 may be inert during power plant startup.

According to an embodiment, size of a LP condensate preheater bypass line 821 may be designed to be able to accommodate 100% condensate preheater bypass flow during power plant startup with stack energy control. The LP condensate preheater bypass flow control valve 822 may be designed accordingly to be able to accommodate 100% condensate preheater bypass flow.

According to an embodiment, pressure of a LP drum 830 may be increased with an aid of a LP drum pressure control valve 832 during power plant startup with stack energy control. According to an embodiment, pressure of the LP drum 830 may be increased by closing the LP drum pressure control valve 832. The LP drum 830 may be isolated during power plant startup. According to an embodiment, safety set point of the LP drum 830 may be increased, for example, up to 510 psia. According to an embodiment, wall thickness of the LP drum 830 may be increased, for example, up to 33 mm.

Referring to FIG. 1, exhaust gas 210 of a gas turbine 200 flows across the heating surfaces of the HRSG 500 to produce steam by extracting energy from the exhaust gas 210. The exhaust gas 210 may exit the combined cycle power plant 100 via an exhaust stack 900. According to an embodiment, the exhaust stack 900 may be exposed to higher temperature and higher temperature transient during power plant startup with stack energy control due to reducing the steam production in the HRSG 500 and less energy is extracted from the exhaust gas 210. The exhaust stack 900 may be designed to be able to accommodate dumping through more energy. According to an embodiment, an insulation layer of the exhaust stack 900 may be added. Internal stiffening structure of the exhaust stack 900 may be avoided due to a high temperature transient. Strength of the exhaust stack 900 may be reinforced by external stiffening structure. Exhaust stack 900 may require smaller and more stiffeners.

According to an embodiment referring to FIG. 3, a combined cycle power plant 100 may be startup in a stack energy control. According to an embodiment, an initial setting of a combined cycle power plant 100 starting with a stack energy control comprises setting up a gas turbine 200 at maximum continuous rating. A final stage attemperator 660*b* may be set to a spray of a temperature, such as about 824° F., to enable a steam turbine 300 to startup. An inter-stage attemperator 660*a* may be set to a spray of a temperature, such as about 27° F. above saturation to maximize heat extraction of exhaust gas 210 at a front end of a HRSG 500. HP bypass steam pressure may be set to a pressure level, such as 1200 psia with an aid of HP steam bypass valve 680, to enable a steam turbine 300 startup. IP bypass steam pressure may be set to a pressure level, such as 290 psia with an aid of IP steam bypass valve 780, to enable a steam turbine 300 startup.

According to an embodiment, HP approach control comprises a temperature difference between water temperature in a HP drum 630 and water temperature at an inlet of the HP drum 630 located downstream of a HP economizer 620. According to an embodiment referring to FIG. 3, HP approach may be controlled by adjusting amount of bypass flow bypassing the HP economizer 620 via the HP economizer bypass lines 621*a* and 621*b*. HP economizer bypass valves 622*a* and 622*b* may be continuously adjusted to control the bypass flow amount. According to an embodiment, a HP approach control in a stack energy control startup may be initially increased to a set point, such as about 140° F., to maintain a minimum flow in the HP economizer 620 during power plant startup.

According to an embodiment referring to FIG. 4, an IP drum pressure control valve 732 may increase an initial set point of an IP drum pressure in a stack energy control startup to a pressure level, such as about 521 psia, to maintain a minimum flow in the IP economizer 720 and keep an IP rotor air cooler 760 in operation during power plant startup.

According to an embodiment referring to FIG. 1, a return piping line of a fuel gas heater 220 may be connected to a condensate line 810. According to an embodiment referring to FIG. 5, a LP condensate preheater 820 may be fully bypassed during stack energy control startup. According to an embodiment, if a return piping line of a fuel gas heater 220 is connected to a condensate line 810 downstream of an inlet of condensate preheater bypass line 821, a fuel gas heater 220 may be switched off in an initial setting of stack energy control startup. According to an embodiment, a return piping line of a fuel gas heater 220 may be modified to connect to a condensate line 810 upstream of an inlet of condensate preheater bypass line 821.

According to an embodiment referring to FIG. 5, condensate isolation valves 823a and 823b may be closed in an initial setting of stack energy control startup. Condensate preheater bypass flow control valve 822 may be open to allow flow bypass a condensate preheater 820 during power plant startup. Condensate preheater recirculation pump 824 may be switched off. LP drum pressure control valve 832 may be closed to isolate the LP drum 830 during power plant startup. LP drum level control valve 831 may be open to allow water in the condensate preheater 820 to boil up and accumulate in the LP drum 830 during power plant startup.

According to an embodiment, a combined cycle power plant 100 may be transitioned between stack energy control startup and a normal operation mode following sequential control steps. Control steps may be performed by a power plant control system. A graphic user interface (GUI) may be provided in a power plant control system for performing transition control steps.

According to an embodiment, transition for a combined cycle power plant 100 from stack energy control startup to a normal operation mode may begin from IP steam system 700 and HP steam system 600 of a HRSG 500 to avoid flashing in LP steam system 800 of the HRSG 500. According to an embodiment, adequate time may be allocated to cool down the LP steam system 800 back to its normal operation temperature level before switching the LP steam system 800 to its normal operation.

FIG. 6 illustrated a schematic flow chart 10 for transition a combined cycle power plant 100 from stack energy control startup to a normal operation mode according to an embodiment. As illustrated in FIG. 6, IP drum pressure set point may be reduced to a pressure level, such as to cold reheat pressure in step S1. This may increase IP steam flow. In step S2, IP economizer bypass valve 722 may be closed. This may allow the IP economizer 720 into operation. In step S3, HP approach control set point may be decreased to a predetermined level, for example, to 35° F. In step S4, HP economizer bypass valves 622a and 622b may be closed. This may allow the HP economizer 620 into operation.

According to an embodiment, LP steam system 800 may be kept shut off until temperature of an exhaust stack 900 cools down and stabilizes at a predicted level. This may cool down LP evaporator 840 and condensate preheater 820. According to an embodiment illustrated in FIG. 6, in step S5, temperature of the exhaust stack 900 may cool down to a predetermined level. According to an embodiment, temperature of the exhaust stack 900 may cool down to its normal operation level, for example, to 376.5° F. This may take approximately about 10 minutes. In step S6, LP drum level control valve 831 may be closed to isolate LP drum 830 from the condensate preheater 820. In step S7, condensate preheater recirculation pump 824 may be switched on to recirculate warm water in the condensate preheater 820. According to an embodiment, the condensate preheater recirculation pump 824 may be switched on at full flow to avoid quench when cold condensate is introduced into the condensate preheater 820. In step S8, condensate preheater bypass flow control valve 822 may be partially closed. According to an embodiment, the condensate preheater bypass flow control valve 822 may be slowly closed from 100% bypass to 93% bypass. Upstream condensate preheater isolation valve 823a may be open. Cold condensate water may mix up with warm water from condensate preheater recirculation return line before reaching an inlet of the condensate preheater 820. In step S9, flow to the condensate preheater recirculation pump 824 may be controlled to maintain water temperature at an outlet of the condensate preheater 820 above water temperature at the inlet of the condensate preheater 820 above certain degrees, for example, above 29° F. According to an embodiment, the flow to the condensate preheater recirculation pump 824 may be controlled by a flow control valve downstream of the condensate preheater recirculation pump 824. In step S10, the condensate preheater bypass flow control valve 822 may be slowly adjusted to slowly increase flow to the condensate preheater 820. According to an embodiment, the condensate preheater bypass flow control valve 822 may be slowly closed further to slowly increase flow to the condensate preheater 820 such that the water temperature at the inlet of the condensate preheater 820 may be reduced with a predetermined rate, such as with a ramping down rate of 45° F./min, until it reaches its normal operation level. According to an embodiment, a normal operation level of the water temperature at the inlet of the condensate preheater 820 may be 136° F. In step S11, the condensate preheater bypass flow control valve 822 may be fully closed when the water temperature at the inlet of the condensate preheater 820 reaches its normal operation level. This may allow the condensate preheater 820 fully in operation.

According to an embodiment illustrated in FIG. 6, in step S12, LP drum pressure control valve 832 may start slowly opening. A pressure of LP drum 830 may be slowly reduced to its normal operation level, for example, to 75 psia. Pressure of LP superheater 850 may be slowly reduced to its normal operation level, for example, to 75 psia. The process may take approximately about 5 minutes. In step S13, LP drum level set point may be raised from startup level to normal operation level after first swell has occurred in the LP drum 830. This may open LP drum level control valve 831 to a certain percentage decided by a control system of a power plant 100. Downstream preheater isolation valve 823b may be open. Water may start filling into the LP drum 830.

According to an embodiment, a power plant 100 may be transitioned from stack energy control startup to a normal operation mode following the sequential control steps as illustrated in FIG. 6. During a normal operation of the power plant 100, steam turbine 300 may need to be restarted in case of a trip of the steam turbine 300. The power plant 100 may need to be transitioned from a normal operation mode to stack energy control startup. This may allow rolling off the steam turbine 300 without reducing a load of gas turbine 200. Transition of the power plant 100 from a normal operation mode to stack energy control startup may be implemented by following the sequential control steps as illustrated in FIG. 6 in a reversed order.

According to an aspect, the proposed embodiments may reduce steam production in a HRSG 500 during a startup of a combined cycle power plant 100. Less energy may be extracted from exhaust gas 210 of a gas turbine 200. More energy more be dumped through exhaust stack 900.

According to an aspect, the proposed embodiments may eliminate restriction of a load of a gas turbine 200 during a startup of a combined cycle power plant 100. The illustrated embodiments may yield a better power generation efficiency of the combined cycle power plant 100.

According to an aspect, the proposed embodiments may eliminate increasing a size of an air cooled condenser to start a steam turbine 300 while maintaining a higher load of a gas turbine 200 during a startup of a combined cycle power plant 100. The illustrated embodiments may eliminate increasing of an overall a combined cycle power plant footprint. The illustrated embodiments may significantly reduce a construction cost of the combined cycle power plant 100.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

LIST OF REFERENCES

100 Combined Cycle Power Plant
120 Plant Power Output of a Conventional Combined Cycle Power Plant
140 Plant Power Output of a Combined Cycle Power Plant with Stack Energy Control
200 Gas Turbine
210 Exhaust Gas from Gas Turbine
220 Fuel Gas Heater
300 Steam Turbine
310 Condenser
400 Generator
500 Heat Recovery Steam Generator (HRSG)
600 High Pressure (HP) Steam System of HRSG
610 Cold Reheat
620 HP Economizer
620a Upstream HP Economizer
620b Downstream HP Economizer
621a Upstream HP Economizer Bypass Line
621b Downstream HP Economizer Bypass Line
622a Upstream HP Economizer Bypass Valve
622b Downstream HP Economizer Bypass Valve
630 HP Drum
631 HP Drum Level Control Valve
640 HP Evaporator
650 Reheater
660 HP Superheater
660a Inter-Stage Attemperator
660b Final Stage Attemperator
670 HP Steam Line
680 HP Steam Bypass Valve
700 Intermediate Pressure (IP) Steam System of HRSG
720 IP Economizer
721 IP Economizer Bypass Line
722 IP Economizer Bypass Valve
730 IP Drum
731 IP Drum Level Control Valve
732 IP Drum Pressure Control Valve
740 IP Evaporator
750 IP Rotor Air Cooler
760 IP Superheater
770 IP Steam Line
780 IP Steam Bypass Valve
800 Low Pressure (LP) Steam System of HRSG
810 Condensate Line
811 Condensate Extraction Pump
812 Boiler Feed Pump
820 Condensate Preheater
821 Condensate Preheater Bypass Line
822 Condensate Preheater Bypass Flow Control Valve
823a Upstream Condensate Preheater Isolation Valve
823b Downstream Condensate Preheater Isolation Valve
824 Condensate Preheater Recirculation Pump
830 LP Drum
831 LP Drum Level Control Valve
832 LP Drum Pressure Control Valve
840 LP Evaporator
850 LP Superheater
860 Isolated Area of LP Steam System
870 LP Steam Line
880 LP Steam Bypass Valve
900 Exhaust Stack

What is claimed is:
1. A combined cycle power plant comprising:
a gas turbine that is configured to generate power output and produce exhaust gas;
a heat recovery steam generator comprising a plurality of heating surfaces located downstream of the gas turbine that is configured to receive the exhaust gas from the gas turbine and produce steam by extracting energy from the exhaust gas;
an exhaust stack that is configured to dump the exhaust gas after passing through the plurality of the heating surfaces;
a steam turbine that is configured to receive the steam produced in the heat recovery steam generator to generate power output, and
a condenser located at an exit of the steam turbine that is configured to feed water to the plurality of the heating surfaces,
wherein the plurality of the heating surfaces are configured to be partially bypassed by the water during startup of the power plant,
wherein the exhaust stack is configured to dump the exhaust gas during the startup of the power plant,
wherein the heat recovery steam generator comprises a high pressure steam system comprising a high pressure economizer,
wherein the high pressure economizer comprises an upstream high pressure economizer and a downstream high pressure economizer,
wherein the upstream high pressure economizer comprises an upstream high pressure economizer bypass line connecting an upstream side of the upstream high pressure economizer to a downstream side of the upstream high pressure economizer,
wherein the upstream high pressure economizer comprises an upstream high pressure economizer bypass valve located at the upstream high pressure economizer bypass line,
wherein the downstream high pressure economizer comprises a downstream high pressure economizer bypass line connecting an upstream side of the downstream high pressure economizer to a downstream side of the downstream high pressure economizer, wherein the downstream high pressure economizer comprises a downstream high pressure economizer bypass valve located at the downstream high pressure economizer bypass line, wherein the upstream high pressure economizer bypass valve is configured to control the water to partially bypass the upstream high pressure economizer via the upstream high pressure economizer bypass line, wherein the downstream high pressure economizer bypass valve is configured to control the water to partially bypass the downstream high pressure economizer via the downstream high pressure economizer bypass line, and wherein a power plant controller is configured to control the upstream high pressure economizer bypass valve and the downstream high pressure economizer bypass valve such that the upstream high pressure economizer bypass line is configured to bypass a higher bypass flow than the downstream high pressure economizer bypass line during the startup of the power plant.

2. The combined cycle power plant as claimed in claim 1, further comprising a high pressure steam bypass valve.

3. The combined cycle power plant as claimed in claim 1, wherein the heat recovery steam generator comprises an intermediate pressure steam system comprising an intermediate pressure economizer, and wherein the intermediate pressure economizer is configured to be partially bypassed during the startup of the power plant.

4. The combined cycle power plant as claimed in claim 1, further comprising an intermediate pressure drum pressure control valve that is configured to increase a pressure of an intermediate pressure drum.

5. The combined cycle power plant as claimed in claim 1, wherein the heat recovery steam generator comprises a low pressure steam system comprising a condensate preheater, and wherein the low pressure steam system is configured to be shut off by bypassing the condensate preheater during the startup of the power plant.

6. The combined cycle power plant as claimed in claim 1, further comprising a low pressure drum pressure control valve that is configured to isolate a low pressure drum during the startup of the power plant.

7. A method for operating a combined cycle power plant, wherein the combined cycle power plant comprise a gas turbine, a heat recovery steam generator comprising a plurality of heating surfaces located downstream of the gas turbine, and a steam turbine, the method comprising:

operating the gas turbine to generate power output and produce exhaust gas;

feeding water from an exit of the steam turbine to the plurality of heating surfaces;

partially bypassing the plurality of the heating surfaces by the water during startup of the power plant;

dumping the exhaust gas through an exhaust stack during the startup of the power plant, and starting the steam turbine while operating the gas turbine at a load up to a base load, wherein the heat recovery steam generator comprises a high pressure steam system comprising a high pressure economizer, wherein the high pressure economizer comprises an upstream high pressure economizer and a downstream high pressure economizer, and wherein the upstream high pressure economizer is partially bypassed to a predetermined level that is higher than a predetermined level to be partially bypassed by the downstream high pressure economizer during the startup of the power plant.

8. The method as claimed in claim 7, wherein the predetermined level to be partially bypassed by the downstream high pressure economizer is determined to allow a predetermined level of flashing in the downstream high pressure economizer during the startup of the power plant.

9. The method as claimed in claim 7, further comprising decreasing a temperature of a high pressure bypass steam during the startup of the power plant.

10. The method as claimed in claim 7, further comprising increasing inter-stage spray water flow by an inter-stage attemperator during the startup of the power plant.

11. The method as claimed in claim 7, wherein the heat recovery steam generator comprises an intermediate pressure steam system comprising an intermediate pressure economizer, and wherein the intermediate pressure economizer is partially bypassed during the startup of the power plant.

12. The method as claimed in claim 7, further comprising increasing a pressure of an intermediate pressure drum during the startup of the power plant.

13. The method as claimed in claim 7, wherein the heat recovery steam generator comprises a low pressure steam system comprising a condensate preheater, and wherein the low pressure steam system is shut off by bypassing the condensate preheater during the startup of the power plant.

14. The method as claimed in claim 7, further comprising isolating a low pressure drum during the startup of the power plant.

15. The method as claimed in claim 7, wherein the combined cycle power plant is transitioned from startup to a normal operation mode following a process comprising:

reducing a pressure of an intermediate pressure drum set point to a cold reheat pressure;

closing an intermediate pressure economizer bypass valve;

decreasing a high pressure approach control set point to a predetermined level;

closing a high pressure economizer bypass valve;

cooling a temperature of the exhaust stack to a predetermined level;

closing a low pressure drum level control valve;

switching on a condensate preheater recirculation pump;

partially closing a condensate preheater bypass valve;

adjusting a condensate preheater recirculation flow to maintain water temperature at a condensate preheater outlet above water temperature at a condensate preheater inlet;

adjusting the condensate preheater bypass valve to reduce the water temperature at the condensate preheater inlet with a predetermined rate;

fully closing the condensate preheater bypass valve when the water temperature at the condensate preheater inlet reaches a desired operation temperature;

opening low pressure drum pressure control valve to reduce pressure of a low pressure drum to a desired operation pressure; and increasing a low pressure drum level set point from a startup water level to a normal water level after swell has occurred in the low pressure drum.

\* \* \* \* \*